United States Patent [19]

Torgrimson

[11] Patent Number: 4,667,432
[45] Date of Patent: May 26, 1987

[54] BOBBER LIFTING DEVICE

[76] Inventor: Donald L. Torgrimson, R.R. 2 Speedway, Minot, N. Dak. 58701

[21] Appl. No.: 897,596

[22] Filed: Aug. 18, 1986

[51] Int. Cl.⁴ .................. A01K 93/00; A01K 97/12
[52] U.S. Cl. ........................................................ 43/17
[58] Field of Search ...................... 43/17, 16, 44.87

[56] References Cited

U.S. PATENT DOCUMENTS

| | | | |
|---|---|---|---|
| 2,587,190 | 2/1952 | Merriweather | 43/17 |
| 3,010,238 | 11/1961 | Crumrine | 43/16 |
| 3,698,117 | 10/1972 | Wiltse | 43/17 |
| 3,984,935 | 10/1976 | Petersen | 43/17 |
| 4,373,287 | 2/1983 | Grahl | 43/17 |
| 4,565,024 | 1/1986 | Maerz | 43/17 |

*Primary Examiner*—Gene P. Crosby
*Attorney, Agent, or Firm*—Merchant, Gould, Smith, Edell, Welter & Schmidt

[57] ABSTRACT

An ice fishing device including an upstanding tube and a base for support on an ice surface. A fishing bobber is floatably suspended within the tube upon an elevated column of water held by vacuum to facilitate visual observation of the bobber.

12 Claims, 5 Drawing Figures

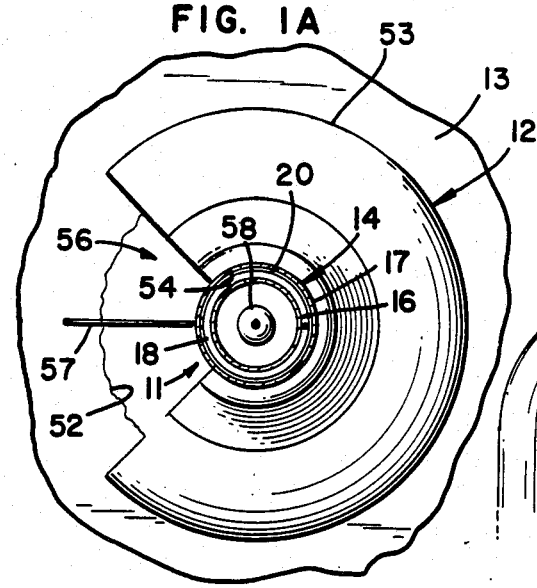
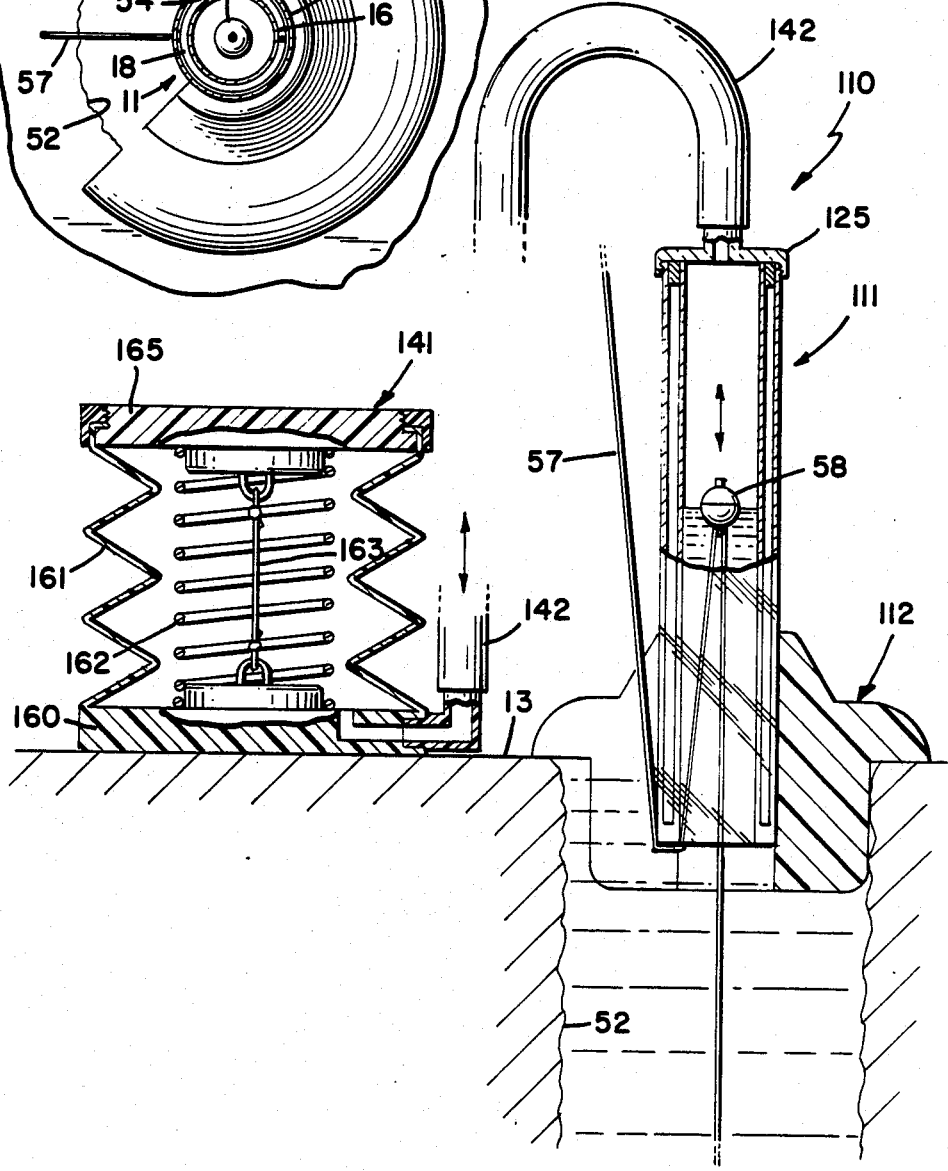

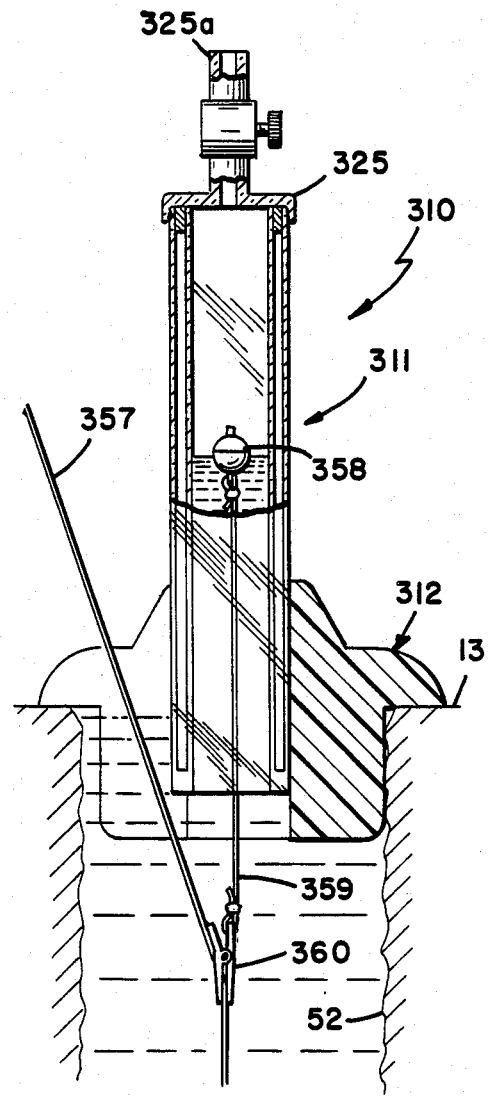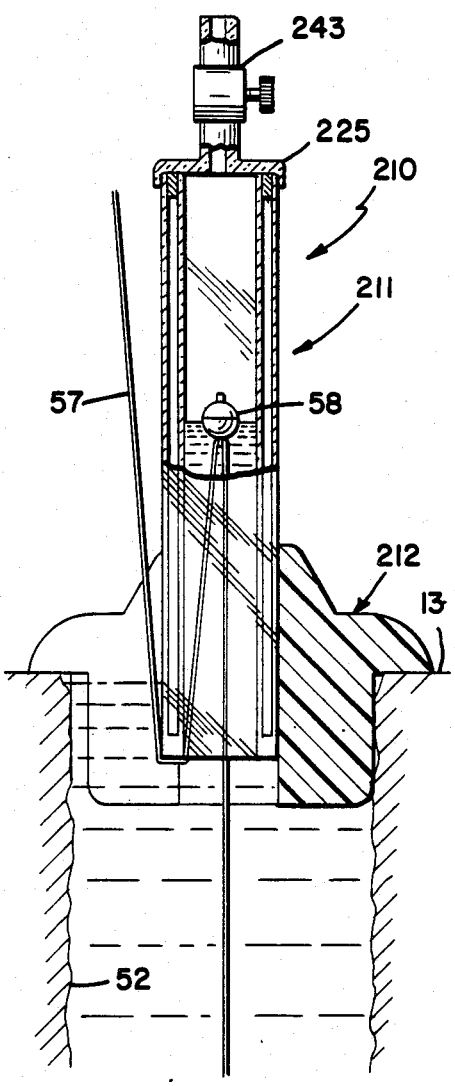

BOBBER LIFTING DEVICE

TECHNICAL FIELD

The present invention relates generally to a fishing device, and more particularly to a fishing device which utilizes an upstanding transparent tube enclosing a fishing bobber attached to fishing line. The bobber provides a visual signal when a fish strikes the fishing line. The fishing device elevates the fishing bobber above the surface of the lake or river to facilitate observation at a distance.

BACKGROUND OF THE INVENTION

Ice fishing has long been a popular past time, and over the years various specialized winter fishing gear has been developed for ice fishing applications. The conventional casting reel and fishing rod normally used by a fisherman in summer months, for example, has gradually been replaced by specialized ice fishing rigs which may be baited and placed over an ice fishing hole cut in the ice cover. Such rigs may be left unattended until a fish takes the bait and triggers a signalling device mounted on the rig. These existing devices are commonly referred to as a "tip-up."

Various prior art tip-up signalling devices have heretofore been developed for use with ice fishing rigs. By far the most common such tip-up mechanism is that of a signal flag, which is mounted on the rig. The flag is automatically triggered into a signalling position in response to a pull upon the fishing line by a fish. The signal flag includes a flag shaft pivotally mounted to the base of the rig at one end and having a flag attached to the opposite free end. Movement of the free end of the shaft into a signalling position is caused by a biasing spring or flexible shaft member, which is triggered by release of a retaining latch responsive to movement of the fishing line. A general discussion of such prior art, for example, may be found in U.S. Pat. No. 4,373,287 to Grahl. Another tip-up mechanism appears in U.S. Pat. No. 3,698,117 to Wiltse, which discloses an ice fishing tip-up including a rotatable reel having fishing line wound thereon and a signal member which is pivotally mounted to the reel in such a manner as to oscillate relative to the ice fishing rig as the fish pulls line off the reel.

Such prior art tip-up devices have not been completely satisfactory. A major disadvantage common to these devices, for example, is that the signalling device is generally exposed to the outside elements of the cold winter climate, and is susceptible of freezing up and becoming inoperative due to the accumulation of snow and ice upon the signalling device. It is further possible for such exposed signalling devices to accidentally release due to wind disturbance.

Another major disadvantage associated with these prior art signalling devices is that they cannot be used in conjunction with conventional fishing rod and casting reel fishing gear. The specialized ice fishing rigs which include these tip-up signalling devices commonly lack the degree of maneuverability and control which a fisherman desires to effectively hook and play a fish which has taken the bait.

Still another disadvantage of these prior art signalling devices is that a relatively strong pull is often required on the fishing line to activate the signalling device. On the signal flag tip-up device, for example, the downward pull exerted by the fish on the fishing line must be sufficient to overcome the resistance of the retaining latch and permit release of the flag shaft. Thus the fisherman does not observe the so-called "nibbling" by the fish prior to the fish actually taking the bait. It is further noted that many of these specialized ice fishing rigs include a fishing line reel presenting additional rotational resistance to any downward movement of the fishing line. Accordingly, many potential fish catches go undetected and the bait may also be lost without one being aware of the presence of a fish. Moreover, attempts to adjustably increase the sensitivity of the signal flag tip-up devices is likely to yield similarly unacceptable results and cause false signals, such as accidental release of the signal flag due to gusts of wind.

Thus, there is a need for an improved signalling device for use in ice fishing which is more sensitive and reliable than the presently available ice fishing rigs and which is further capable of being used with conventional fishing gear to provide the ice fisherman with greater flexibility and control than is offered by the prior art devices.

SUMMARY OF THE INVENTION

The present invention provides a transparent tube and a base for mounting such tube over an opening in the ice. Mechanism is provided for maintaining a partial vacuum in the upper portion of the tube thereby drawing lake or river water up into the tube. A bobber is floated on the surface of the water in the tube with the bobber being attached to a fishing line. Normally the water will fill only a portion of the transparent tube such that the bobber is supported intermediate the upper end of the tube and the surface of the lake or river.

Various types of mechanism may be used for drawing the partial vacuum in the upper portion of the tube. For example, a small electrically-powered air pump may be attached to the upper portion of the tube and operated to draw the partial vacuum. Alternatively, any of various hand-operated air pumps are suitable. One highly-simplified embodiment of the present invention merely provides a valve at the upper end of the tube. The valve is opened while the tube is partially submerged. The valve is then closed and the tube raised to its normal operating position. This lifts the water with respect to the lake level.

BRIEF DESCRIPTION OF THE DRAWINGS

A more complete understanding of the invention may be had by reference to the following when taken in conjunction with the accompanying drawings, wherein:

FIG. 1A is a cut view taken along the line 1A—1A in FIG. 1.

FIG. 2 is an alternative embodiment of the present invention shown with portions broken away to disclose underlying structure; and FIG. 3 shows a further embodiment of the present invention.

FIG. 4 shows a still further embodiment of the present invention.

DETAILED DESCRIPTION OF THE INVENTION

Figure 1:
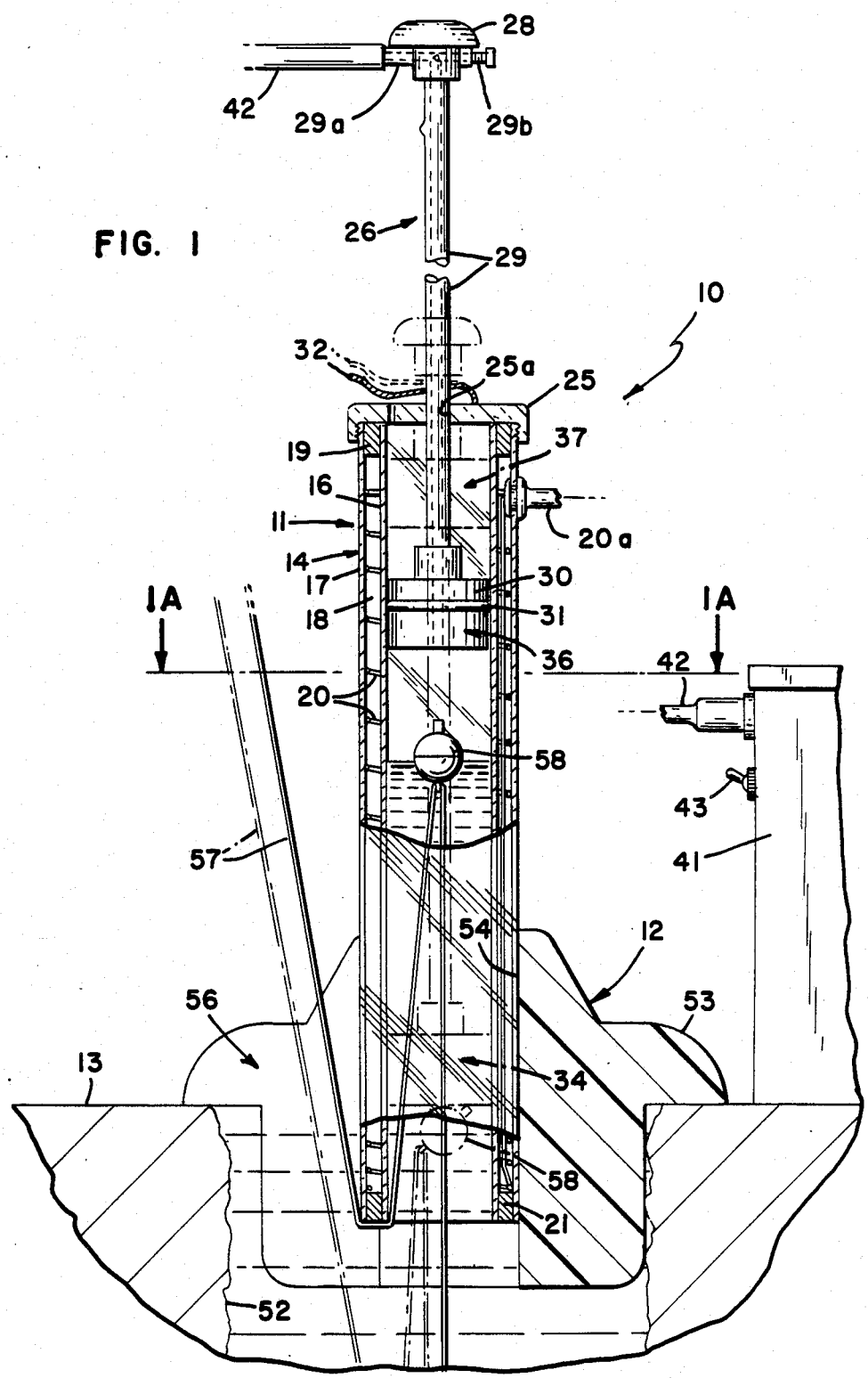
FIG. 1 is an elevational view of an embodiment of the invention shown partially in cross section.

The present invention 10, as illustrated in FIG. 1, may include an upstanding tube 11 which is supported by a base 12 with respect to a layer of ice 13 such as on a river or a lake surface. The tube 11 may be of any suitable rigid, transparent material such as polyterethphalate and the like. The tube 11 has a sidewall 14 which, as shown in FIG. 1, may be of an innerwall portion 16, an outerwall portion 17 and a vacuum zone 18 therebetween. The vacuum zone 18 serves as an insulating barrier and tends to decrease the likelihood of ice forming within the tube under extremely cold temperatures. Suitable seals 19 and 21 may be provided between wall portions 16 and 17 at either end of tube 11. The upper end of tube 11 is closed by end cap 25. An opening 25a is provided in end cap 25 for purposes hereafter set forth.

Ice fishing device 10 has a hand pump 26 for creating a partial vacuum and drawing lakewater 27 upward into tube 11. The hand pump 26 includes a handle 28, a rod 29 and a plunger 30. The plunger 30 has an outer diameter substantially the same dimension as the inner diameter of portion 16. The plunger 30 may include a seal ring 31 to provide sealing engagement between plunger 30 and innerwall portion 16. A friction lock 32 is provided to engage rod 29 to lock the pump 26 in any desired position; for example, the lowermost position shown by the broken lines at 34, the intermediate position shown at 36 or the elevated position of 37.

The ice fishing device 10 is illustrated in FIG. 1 with a second mechanism for creating the partial vacuum; namely, an electric vacuum pump 41. With the hand pump 26 in its uppermost position illustrated at 37, the pump 41 may be used to raise and/or lower the water level 27. The electric pump 41 may be connected to ice fishing device 10 by suitable tubing 42. A switch, such as 43, may be used to control the operation of pump 41. Pump 41 may communicate with tube 11 through the upper end 29a of rod 29. The rod 29 may be hollow and provided with suitable valving 29b.

The upper portion of tube 11 is closed by end cap 25 which has an opening 25a through which rod 29 of pump 26 extends. The locking device 32 may be mounted on cap 25 and is spring-urged upwardly to provide locking engagement with rod 29.

The base 12 of ice fishing device 10 may be constructed of any suitable material, such as styrofoam, polyethylene or the like. The base 12 has a portion 51 which extends into the opening 52 in ice layer 13. Base 12 has an outwardly-extending flange 53 which rests upon the upper surface of ice layer 13 to provide stability. Base 12 further includes an opening 54 which is of substantially the same diameter as tube 11 such that there is a friction fit or locking device between tube 11 and base 12. The tube 11 may have an electrical heating element 20 disposed between walls 14 and 16 and connected to an electrical source by conduit 20a.

The base 12 (FIG. 1A) has a slot 56 along which the fishing line 57 may extend. The fishing line 57 extends downwardly beneath the lower extremity of tube 11, then upwardly to the bobber 58 and then downwardly to the fish hook and bait.

Various modifications may be made in the ice-fishing device 10 without departing from the broader scope of the present invention. For example, the ice fishing device 10 is shown with both a hand-operated pump 26 and an electrically-operated pump 41. The present invention may be provided with only a hand-operated pump or an electrically pump. Alternatively, any other mechanism may beprovided that will result in the partial vacuum in the upper portion of the tube 11 thereby raising the water level to a visible point within the tube 11. Moreover, while the present invention is disclosed for use on a layer of ice, it is to be recognized that the base 12 may be sufficiently broad and buoyant to permit use of the device on open water.

OPERATION

Although operation of the present invention is apparent from the aforedescription, in order to provide a more complete understanding of the present invention, the operation is hereinafter set forth. A fisherman desiring to use the device may first assemble the tube 11 by insertion into opening 54 in base 12. An opening of suitable dimensions is cut in the ice layer 13. Base 12 is mounted over such opening as illustrated in FIG. 1. The hand-operated pump 26 is then lowered to the position illustrated at 34 thereby forcing a substantial portion of the air out of tube 11. The pump 26 is then drawn upwardly by grasping the knob 28, thereby drawing the water 27 into the tube as illustrated in FIG. 1.

In order to operate the locking device 32, manual pressure is applied downwardly, thereby releasing such locking device. When the locking device 32 is released, it is biased upwardly into binding engagement with the rod 29.

The fisherman may then observe the bobber when a fish pulls the bobber 58 beneath the surface of the water in the tube 11. Such movement is readily visible through the transparent wall of tube 11. The fisherman then reacts in the normal manner by pulling the line to set the hook, thereby drawing the bobber downwardly out of the tube 11 and up through slot 56. A fishing technique known as jigging may be accomplished by moving the hand pump 26 upwardly and downwardly, thereby moving the water level 27 within the tube 11 resulting in the buoyancy of bobber 58 raising and lowering the bait.

Alternate operation of the device may be provided by positioning the hand pump 26 in the uppermost position illustrated at 37. The base and tube are then positioned over the opening in the ice and the electric pump 41 is placed in operation to draw a partial vacuum between the plunger 36 and the water level 27 in the tube 11, thereby raising the water upwardly into the tube 11. The pump 41 may be reversible in order to provide for the aforedescribed jigging operation. The electrical heating element 20 serves to prevent freezing of the water in the tube 11.

ALTERNATE EMBODIMENTS

An alternate embodiment 110 is illustrated in FIG. 2. Ice-fishing device 110 includes a tubular wall 111 and a base 112 substantially similar to that described with respect to the embodiment shown in FIG. 1. The ice-fishing device 110 has an upper cap 125 which communicates with a tube 142 running to a foot operated air pump 141. The foot pump 141 may be of any conventional structure, including a bellows 161, and a spring 162. The pump includes a base 160 and an upper platform 165. A line 163 limits movement of base 180 and platform 165 under bias of spring 162. Depression of the platform 165 forces air 30 from within the pump 141 through tube 142 into tube 111, thus expelling air in tube 111 out the open bottom thereof. Release of the platform then draws air from the tube 111 through tube 142, thereby raising the water level within tube 111. The fishing line 57 and bobber 58 may be inserted and operated as described with 35 regard to ice fishing device 10.

Slight movement of the pump 141 causes a jigging action to bobber 58 as before described.

A highly-simplified ice fishing device 210 is illustrated in FIG. 3. The device 210 includes a tubular member 211 which is mounted in base 212 by frictional or locking engagement. Base 212 may be constructed as described with regard to base 12. The tube 211 includes an upper cap 225 with a tubular extension 242. A valve 243 is provided in the tubular extension 242. The device may be operated by positioning over a suitable opening in the ice as described with regard to fishing device 10. The valve 243 is opened and tube 11 is moved downwardly along the base 212 until the cap 225 closely approaches the base 212. The valve 243 is then closed, sealing the upper end of tube 211. The tube is then moved upwardly along base 212 to the position illustrated in FIG. 3, thereby pulling the water level upwardly into view. The remaining operation of ice-fishing device 210 may be as described with regard to ice-fishing device 10 and 110.

A further embodiment of the present invention, device 310 is shown in FIG. 4. Device 310 has a cylindrical side wall 311 and a closed upper end 325 with a tubular opening 325a for communication with a vacuum pump (not shown). The device 310 includes a bobber 358 with a line 359 and clip 360 for connection to a fishing line 357. The device 310 has a suitable base 312 as previously described.

What is claimed is:

1. Apparatus for use with fishing line and fishing bobber, said apparatus serving to elevate said bobber relative to the normal water level of the surface of a body of water, comprising:
   a generally transparent cylindrical indicator tube having an open lower end for communication with said body of water and a closed upper end;
   means for support of said tube in an upright position with said lower end extending below said normal water level and said upper end projecting above said normal water level; and
   means for establishing a partial vacuum within said tube for upwardly drawing a volume of water from said body of water to partially fill said tube, said closed upper end serving to retain said volume of water therewithin at an elevated water level;
   whereby said fishing bobber is floatably suspended within said tube upon said elevated water level thereby facilitating visual observation at a distance of any downward movement of said bobber caused by a fish pulling upon said fishing line.

2. Apparatus in acccordance with claim 1, wherein said means for establishing a partial vacuum comprises a vacuum piston slidably received within said tube, said piston having a piston rod extending through said upper end of said tube, whereby said volume of water is drawn within said tube by upwardly pulling said piston rod to exert a vacuum pressure within said tube.

3. Apparatus in accordance with claim 1, wherein said means for establishing a partial vacuum comprises a vacuum pump communicating with said upper end of said tube, whereby air removed from within said tube by said vacuum pump exerts a vacuum pressure within said tube.

4. Apparatus in accordance with claim 1, wherein said means for support comprises a buoyant member secured to said tube.

5. Apparatus in accordance with claim 4, wherein said buoyant member includes means for adjusting the height of said upper end of said tube relative to said normal water level.

6. Apparatus in accordance with claim 5, wherein said means for height adjustment comprises a means for vertically positioning said upper end of said tube relative to said buoyant member.

7. Apparatus in accordance with claim 1, wherein said means for support comprises an ice fishing support member for supportable placement of said tube in an ice fishing hole cut in the surface of ice formed upon an underlying body of water, whereby said elevated water level is maintained above said ice surface.

8. Apparatus in accordance with claim 7, wherein said indicator tube includes means for insulating said tube to minimize the likelihood of freezing of said volume of water elevated within said tube.

9. Apparatus in accordance with claim 8, wherein said insulating means for said indicator tube includes spaced-apart inner and outer walls defining an enclosed insulating chamber between said inner and outer walls to prevent freezing of said volume of water elevated within said tube.

10. Apparatus in accordance with claim 7, wherein said tube includes means for providing heat therewithin.

11. Apparatus in accordance with claim 10, wherein said means for providing heat comprises an electrical heating element disposed within said insulating air chamber and means for supply of electric current thereto.

12. A method for elevating the normal water level of a body of water to floatably suspend a fishing bobber upon said elevated water level, said method comprising the steps of:
   (a) inserting a fishing bobber and portion of fishing line attached thereto inside a generally transparent cylindrical indicator tube having an open lower end and a closed upper end with a normally closed air valve proximate thereto, said tube including means for support of said tube in an upright position with said lower end extending below said normal water level and said upper end projecting above said normal water level;
   (b) opening said air valve;
   (c) lowering said lower end of said tube into said body of water to a first depth thereby causing a volume of water to enter said tube to partially fill said tube and floatably suspend said fishing bobber therein;
   (d) closing said air valve;
   (e) raising said tube to a second depth wherein said lower end of said tube is supportably positioned at a relatively lesser depth beneath said normal water level than at said first depth;
   (f) whereby said volume of water is retained by vacuum pressure within said tube at an elevated water level relative to said normal water level, said fishing bobber being floatably suspended within said tube upon said elevated water level to facilitate visual observation at a distance of any downward movement of said bobber caused by a fish pulling upon said fishing line.

* * * * *